UNITED STATES PATENT OFFICE.

ALEXANDER D. ELBERS, OF HOBOKEN, NEW JERSEY.

IMPROVEMENT IN PROCESSES OF TREATING ARTIFICIAL MINERAL WOOL TO RENDER IT LESS BRITTLE FOR PAPER, &c.

Specification forming part of Letters Patent No. 195,889, dated October 9, 1877; application filed May 25, 1877.

*To all whom it may concern:*

Be it known that I, ALEXANDER D. ELBERS, of Hoboken, Hudson county, New Jersey, have invented an Improved Process of Treating Mineral Wool, of which the following is a specification:

This invention has for its object to adapt the article known as "mineral wool," which is an artificial product of scoriaceous mineral substances, for use in the arts, such as the manufacture of paper.

This mineral wool, in its normal condition, is too brittle to be used with advantage in such arts as paper-making; and the invention consists in a novel process of attenuating or reducing the mineral-wool fibers, and rendering them flexible and more pliant for use in the arts by steeping them in an acid, all as is hereinafter more fully described.

The invention also consists in the improved attenuated mineral wool produced by said improved process.

Mineral-wool fibers are composed mainly of silica, lime, alumina, magnesia, and a varying percentage of sulphide of lime.

In order to reduce or attenuate these fibers, and render them pliable, I steep the wool in, or otherwise subject it to, the action of an acid, preferably an organic diluted acid, which will affect the sulphide of lime contained in the fibers of the mineral wool in such manner as to liberate sulphureted-hydrogen gas, and thereby will reduce the fibers and attenuate them, and render them flexible or pliant to a sufficient degree to be used in the arts.

For this purpose I prefer diluted acetic acid; but any acid having an affinity for the constituents of the sulphide of lime will evidently answer the purpose. The period for exposing the mineral wool to the acid varies, of course, with the quantities employed and with the degree of dilution.

Small quantities of mineral wool will be properly attenuated by ordinary vinegar in about thirty to forty minutes.

After the mineral wool has remained in the acid for a sufficient length of time to properly reduce the fibers, or during this process, it may be agitated, either by a mechanical agitator, or by currents of boiling water, or by other suitable means. This will cause the heavier residue or shot-like particles in the mineral wool to settle at the bottom, while the reduced fibers will float near the top, and may be readily dipped from the fluid for use in the manufacture for which the same are intended, and for admixture with such substances with which it may be desired to use them.

I claim as my invention—

1. The process of treating mineral wool by steeping the same in an acid, for the purpose of rendering it flexible or more pliant, and adapting it for use in the arts, substantially as described.

2. As a new article of manufacture for use in the arts, the reduced or attenuated mineral wool herein described.

The above specification of my invention signed by me May 22, 1877.

ALEXANDER D. ELBERS.

Witnesses:
A. D. ELBERS,
ERNEST C. WEBB.